(12) United States Patent
Hanten

(10) Patent No.: US 8,882,570 B2
(45) Date of Patent: Nov. 11, 2014

(54) CLIPPING MACHINE AND METHOD FOR CONTROLLING SAID CLIPPING MACHINE

(75) Inventor: Jürgen Hanten, Bad Nauheim (DE)

(73) Assignee: Poly-Clip System GmbH & Co. KG, Hattersheim (DE)

( * ) Notice: Subject to any disclaimer, the term of this patent is extended or adjusted under 35 U.S.C. 154(b) by 396 days.

(21) Appl. No.: 13/309,091

(22) Filed: Dec. 1, 2011

(65) Prior Publication Data
US 2012/0142261 A1 Jun. 7, 2012

(30) Foreign Application Priority Data

Dec. 1, 2010 (EP) .................................... 10015203

(51) Int. Cl.
*A22C 11/00* (2006.01)
*A22C 11/02* (2006.01)

(52) U.S. Cl.
CPC .................................. *A22C 11/0245* (2013.01)
USPC ........................................................... 452/37

(58) Field of Classification Search
USPC ............ 452/21–26, 30–32, 35–37, 46–48, 51
See application file for complete search history.

(56) References Cited

U.S. PATENT DOCUMENTS

| | | |
|---|---|---|
| 4,347,646 A | 9/1982 | Staudenrausch |
| 4,558,488 A | 12/1985 | Martinek |
| 4,563,792 A | 1/1986 | Niedecker |
| 4,602,402 A * | 7/1986 | Schnell ........................... 452/31 |
| 4,625,362 A | 12/1986 | Kollross et al. |
| 4,712,273 A | 12/1987 | Wagner |
| 4,766,645 A | 8/1988 | Lamartino et al. |
| 4,837,897 A | 6/1989 | Lamartino |
| 5,083,970 A | 1/1992 | Reutter |
| 7,955,165 B2 * | 6/2011 | May et al. ........................ 452/30 |
| 8,231,442 B2 * | 7/2012 | Baechtle et al. ................. 452/49 |
| 8,323,079 B2 * | 12/2012 | Hanten ........................... 452/31 |
| 8,366,523 B2 * | 2/2013 | Topfer ............................ 452/51 |
| 8,371,910 B2 * | 2/2013 | Fredberger et al. ............. 452/40 |

FOREIGN PATENT DOCUMENTS

| | | |
|---|---|---|
| DE | 2249070 C2 | 8/1983 |
| DE | 198 24 829 A1 | 12/1999 |
| EP | 0013552 A1 | 7/1980 |
| EP | 0061955 A1 | 10/1982 |
| EP | 0204086 A1 | 12/1986 |
| GB | 2 050 801 A | 1/1981 |
| JP | 05-344835 A | 12/1993 |
| JP | 06-033479 U | 5/1994 |

OTHER PUBLICATIONS

DE 198 24 829 A1—English abstract obtained from Espacenet (http://worldwide.espacenet.com) accessed on Mar. 12, 2012, 1 page.

* cited by examiner

*Primary Examiner* — Richard Price, Jr.
(74) *Attorney, Agent, or Firm* — Hahn Loeser & Parks LLP

(57) ABSTRACT

A clipping machine for producing sausage-shaped products, containing a flowable filling material, like a sealing compound, in a tubular casing material. The clipping machine comprises a filling tube for feeding filling material into the tubular casing material stored on the filling tube and being closed at the front end by a closing clip, a clipping device for placing and closing at least one closing clip on the back end of a tubular casing material just filled, and a control unit for controlling the clipping machine. The clipping machine further comprises a first sensor for measuring the pull-off length of the tubular casing material pulled off from the filling tube as well as a second sensor for measuring the movement of the filling material while being fed to the tubular casing material.

17 Claims, 4 Drawing Sheets

CLIPPING MACHINE AND METHOD FOR CONTROLLING SAID CLIPPING MACHINE

This application claims priority to, and the benefit of, European Patent Application No. 10 015 203.2-1260 filed Dec. 1, 2010 with the European Patent Office, which is hereby incorporated by reference.

BACKGROUND OF THE INVENTION

The present invention relates to a method for controlling a clipping machine for producing sausage-shaped products according to claim 1 as well as a clipping machine for producing sausage-shaped products according to claim 8.

In particular, the present invention relates, besides the method for controlling a clipping machine, to a clipping machine for producing sausage-shaped products containing a flowable filling material, like a sealing compound, in a tubular casing material. The clipping machine comprising a filling tube for feeding filling material into the tubular casing material stored on the filling tube and being closed at the front end by a closing clip, a clipping device for placing and closing at least one closing clip on the on the back end of the tubular casing material just filled, and a control unit for controlling the clipping machine.

In the practice, it is known that, for example in the production of sausage-shaped products, filling material is fed by a filling machine through a filling tube of a clipping machine into a tubular casing material, which is stored on the filling tube and which is closed at its front end by a closing clip. The tubular casing material is pulled off from the filling tube while being filled. After a predetermined volume of filling material is filled into said tubular casing material, a displacement device with a first and a second pair of displacement elements forms a plait-like portion of the tubular casing material and the clipping machine places and closes at least one closing clip at the plait-like portion forming the back end of the sausage shaped product by respective closing tools which are reversibly movable towards the plait-like portion. After that, the sausage-shaped product just produced, is separated from the remaining casing material by a knife or the like of a cutting device of the clipping machine. The produced sausage-shaped product products may contain various flowable filling materials, e.g. sausage meat, grease, adhesives, sealing compounds or the like.

A clipping machine of this known type for producing sausages is disclosed in German patent application 198 24 829. In order to produce sausages of constant length and equal filling degree, the filling material is fed at a constant volumetric flow rate and the filling degree is sensed by a sensor acting on the just filled portion of the sausage to be produced. A casing break device is positioned in the region of the front end of the filling tube for applying a frictional force to the casing material while being pulled off from the filling tube. The sensor detects a deviation of the filling degree and activates the casing break device to readjust the pull-off speed of the tubular casing material. Furthermore, a counting wheel measures the pulled off length of the tubular casing material and stops the pulling-off when a predetermined length of the sausage is achieved. This device shall reduce casing material bursts by controlling the constant filling degree.

The pull-off speed of the casing material will be adapted to a varying filling degree. Thus, in case of a burst of the tubular casing material causing a deviation of the filling degree, at first the pull-off speed of the tubular casing will be re-adjusted. While trying to readjust said pull-off speed a large amount of filling material may escape from said burst casing material before the clipping machine will be stopped. Moreover, in case of a small material defect, like a leak, the known clipping machine will try to readjust the pull-off speed of the casing material for a much longer time, thereby the clipping machine will be contaminated by the filling material escaping from said leak. Thus, even if said clipping machine would detect a burst of the tubular casing material or a leak in said casing material, it takes a long time from the occurrence of a burst or a leak to a respective reaction of the clipping machine, like a stop. In this time, a large amount of filling material contaminates the clipping machine and leads to time-consuming cleaning of the clipping machine, additional scrap-rates and production losses.

BRIEF SUMMARY OF THE INVENTION

Thus, it is an object of the present invention to provide a method for controlling a clipping machine as well as a clipping machine, with which the above mentioned drawbacks can be overcome and with which bursts of casing material can surely immediately be detected.

The aforesaid object with regard to the method for controlling the clipping machine is achieved by the features of claim 1. Advantageous configurations of the clipping machine are described in claims 2 to 7. The aforesaid object with regard to the clipping machine is achieved by the features of claim 8. Advantageous method steps are described in claims 9 to 12.

According to the present invention, there is provided a method for controlling a clipping machine for producing sausage-shaped products, containing a flowable filling material, like a sealing compound, in a tubular casing material. The method comprises the steps of feeding the filling material into the tubular casing material stored on a filling tube and being closed at the front end by a closing clip, and placing and closing at least one closing clip on the back end of the tubular casing material just filled by a clipping device.

The method according to the present invention further comprises the steps of capturing a pull-off length of the tubular casing material when pulled off from the filling tube by a first sensor, capturing a movement of the filling material while being feed to the tubular casing material by a second sensor, creating a ratio between the pull-off length of the tubular casing material and the movement of the filling material, and generating a control signal by a control unit for acting on the clipping machine based on the ratio between the pull-off length of the tubular casing material and the movement of the filling material. The inventive method thereby assures that in case of a burst of the casing material, the clipping machine is immediately be stopped by the control unit. Also in case of small leaks, a respective control signal may be generated for stopping the clipping machine. The amount of filling material escaping from said leak or burst casing material as well as the shutdown period of the clipping machine is thereby reduced to a minimum. Moreover, the time being necessary for cleaning the clipping machine can remarkably be reduced.

It has to be noted that the inventive method can also include a step for producing a plait-like portion before placing and closing the closing clip. For this purpose, the filled tubular casing material is gathered by a displacement device with a first and a second pair of displacer elements for forming a plait-like portion at the back end of the sausage-shaped product, being at least substantially free of filling material. For placing and closing the closing clip, closing tools, i.e. a matrix and a die, are used, being reversibly movable relative to one another between an opened position and a closed position.

While capturing the pull-off length of the tubular casing material when pulled off from the filling tube, first sensor provides a signal to the control unit, which allows determining not only the pull-off length but also the pull-off speed of the tubular casing material when pulled off from the filling tube. Accordingly, while capturing the movement of the filling material while being feed to the tubular casing material, second sensor provides a signal to the control unit, which also allows determining the volumetric flow rate of the filling material while being feed to the tubular casing material. The term "movement of the filling material" has to be understood as being a characteristic, which is at least proportional to the flow rate of the filling material or the volumetric flow rate of filling material when related to e.g. the diameter of the filling tube.

Advantageously, the control unit compares the ratio of the captured values of the pull-off length of the tubular casing material and the movement of the filling material to predetermined comparison ratios, in accordance with specific product features, like product types, filling material or tubular casing materials, which are stored in the control unit. This enables a quick and easy adaption of the production process to different types of product to be produced. Said comparison ratios may be ratio values in the form of a quotient or difference values of the pull-off length of the tubular casing material and the movement of the filling material.

While comparing the captured ratios to predetermined comparison ratios, the control unit detects a change of the captured ratios in accordance with the predetermined comparison ratios. According to the amount of said change, different control signals may be provided, like a full stop of the clipping machine or a notification to the operator. Moreover, a tolerance value or threshold values may be allowed for a deviation, e.g. in adaption to different types of products. According to the present invention, the control unit compares the predetermined comparison ratios and the captured to detect casing material bursts, thereby allowing a quick reaction to said material bursts, reducing losses in material and production and maintenance time.

A possible action in case of an impermissible deviation between the comparison ratio and the ratio created from the captured values of the pull-off length of the tubular casing material and the movement of the filling material may be that the control unit shuts down the clipping machine. Alternatively or additionally, further actions are possible, like out putting an alarm signal, recording the detected errors and respective control steps or the like.

The movement of the filling material may be captured at different locations in the clipping machine. In an advantage configuration, the movement of the filling material is captured based on a signal derived from the material flow through the filling tube. A respective sensor for sensing the material flow may be coupled to one end of the filling tube or at a location inside the filling tube.

Alternatively, in case that there is provided a system comprising a clipping machine and a filling device or filler including a feeding device, like a pump, for feeding the filling material to the filling tube, the movement of the filling material may be captured on the basis of a signal derived from said feeding device for the filling material. In this case, the rotation of the main axis of said pump may be sensed, or the movement of any other part of said pump, which corresponds to the material flow.

According to the present invention, there is further provided a clipping machine for producing sausage-shaped products containing a flowable filling material, like a sealing compound, in a tubular casing material. The clipping machine comprises a filling tube for feeding filling material into the tubular casing material stored on the filling tube and being closed at the front end by a closing clip, a clipping device for placing and closing at least one closing clip on the back end of the tubular casing material just filled, and a control unit for controlling the clipping machine.

The clipping machine according to the present invention further comprises a first sensor for measuring the pull-off length of the tubular casing material pulled off from the filling tube and a second sensor for measuring the movement of the filling material while being fed to the tubular casing material, wherein the first and second sensors are adapted for intercommunicating with the control unit. The inventive control unit is further adapted to create a ratio between the pull-off length of the tubular casing material when pulled off the filling tube and the movement of the filling material while being feed to the tubular casing material, both captured by the first and second sensors, and that the control unit is further adapted to generate a control signal to act on the clipping machine based on the ratio between the pull-off length of the tubular casing material and the movement of the filling material.

First and second sensors may reliably sense the movement of the casing material and the filling material or an adequate movement, forming a basis for capturing the respective values of the pull-off length of the tubular casing material and the movement of the filling material. In case of a burst of the tubular casing material, the clipping machine may immediately and surely be shut down by the control unit to reduce a contamination by the escaping filling material and to reduce time and production losses. Moreover, the time being necessary for cleaning the clipping machine can remarkably be reduced.

It has to be noted that the inventive clipping machine can also include a displacement device with a first and a second pair of displacer elements for gathering the filled tubular casing material for forming a plait-like portion being the back end of the sausage-shaped product to be produced and being at least substantially free of filling material. Said known clipping machines also comprising at least two closing tools, being reversably movable relative to one another between an opened position and a closed position in order to place and close the at least one closing clip on the back end of the tubular casing material just filled.

In an advantageous configuration, the first and second sensors are coupled to a first measuring unit. In said first measuring unit, signals provided by the first and second sensors, may be used to determine the pull-off length of the tubular casing material and the movement of the filling material.

The first measuring unit may be positioned at different locations in the clipping machine. It is possible, that the first measuring unit is incorporated into the control unit. In this case, a direct transfer of the measurement results to a respective part of the control unit can occur. On the other hand, the first measuring unit may be separated from the control unit. Such a separate measuring unit may be provided as an upgrade to existing clipping machines or control units.

According to the present invention, measuring the pull-off length of the tubular casing material may be executed in various ways. Said pull-off length may be directly measured via sensing the pull-off length, in order to determine e.g. the pull-off speed, said measured pull-off length may be correlated to the respective pull-off time, e.g. in said first measuring unit. The pull-off length may also be measured indirectly via speed sensing elements including a timing device. The general idea is to capture a value representing the pull-off length and producing a signal representing said pull-off speed.

Sensors for capturing a respective value for instance may be a counting wheel for capturing the pull-off length or the pull-off speed and a volumetric flow meter for capturing the movement of the filling material, e.g. represented by the flow volume. It has to be understood, that various other sensors may be used for capturing said values.

The first sensor and the second sensor may be spatially separated from the at least one measuring unit. In this configuration, the locations or sensing positions for said first and second sensors may be selected independently from the at least one measuring unit.

In a further advantageous configuration, a second measuring unit is provided, wherein the first measuring unit comprises the first sensor and the second measuring unit comprises the second sensor. By using separate measuring units for each of the first and second sensor, specific measurement units may be selected, which are adapted to the specific type of sensor to improve the measurement results.

In the following, further advantages and embodiments of the inventive method and the inventive clipping machine are described in conjunction with the attached drawings. Thereby, the expression "left", "right", "below" and "above" are referred to the drawings in an orientation of the drawings which allows the normal reading of the reference numbers.

DETAILED DESCRIPTION OF THE INVENTION

Figure 1:
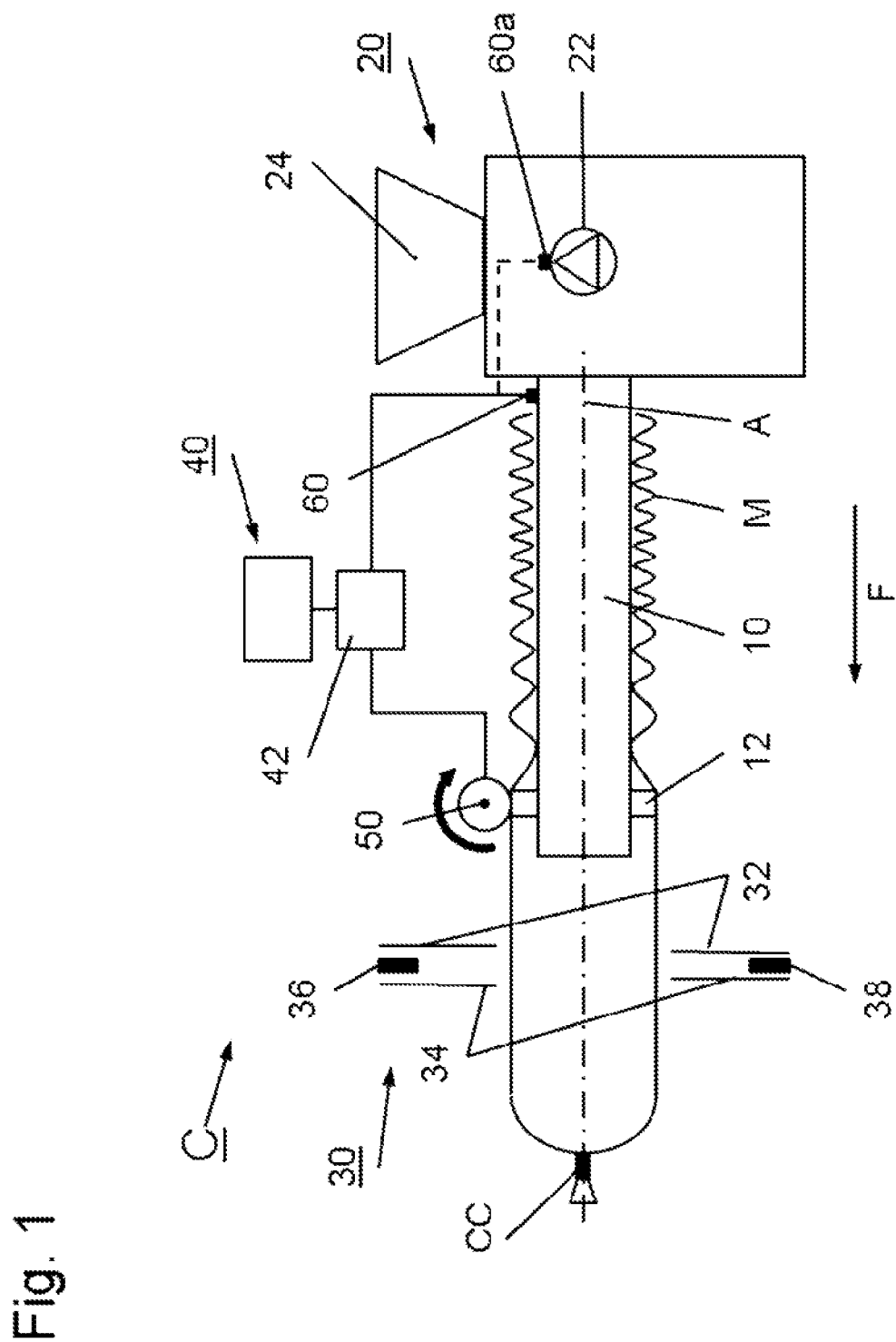
FIG. 1: is a schematically view of a clipping machine for producing sausage-shaped products according to a first embodiment of the present invention.

The first embodiment of an inventive clipping machine C for producing sausage-shaped products according to FIG. 1, comprises as main components a circular cylindrical filling tube 10 having a longitudinally extending axis A and being made of stainless steel, wherein tubular casing material M made of a thin sheet material is stored in the shape of a bellow on the filling tube 10, a clipping device 30 for closing the filled tubular casing material M, and a control unit 40 for controlling clipping machine C. As it further can be seen in FIG. 1, a filler 20 including a pump 22 for feeding filling material, like a sealing compound, through filling tube 10 in a feeding direction F into the tubular casing material M is coupled upstream to clipping machine C.

According to FIG. 1, horizontally arranged filling tube 10 is coupled to filler 20 by its right end via a not shown coupling device, like a pivotal coupling hinge. Filler 20 includes pump 22 for feeding the filling material to filling tube 10. Downstream filling tube 10, a clipping device 30 is arranged in front of the left side opening of filling tube 10. Clipping device 30 comprises a first and a second pair of displacer elements 32, 34 for forming in known manner a plait-like portion of the tubular casing material M being at least approximately free of filling material. Moreover, closing tools in the form of a punch 36 arranged between displacer elements 32, 34 above filling tube 10 and a die 38 positioned between displacer elements 32, 34 below filling tube 10 opposite to punch 36 are provided for attaching at least one closure clip CC at the plait-like portion of the tubular casing material M. Clipping device 30 further comprises respective drives for driving displacer elements 32, 34, punch 36 and/or die 38, which are not shown. Moreover, a clip supply, also not shown, is provided for storing and supplying closure clips to closing tools 36, 38. In order to separate a just produced sausage-shaped product from the remaining tubular casing material M stored on the filling tube 10, a cutting device (not shown) is provided, which includes a knife and a respective drive for said knife which cuts the tubular casing material M in the region of the plait-like portion, preferably between two closure clips CC.

In the region of the left end of filling tube 10, a casing break device 12 is arranged for applying a predetermined frictional force to the tubular casing material M and for unfolding tubular casing material M while pulled off from filling tube 10. A first sensor in the form of a counting wheel 50 is provided to clipping machine C. Counting wheel 50 is positioned above casing break device 12 and detects the length of the tubular casing material M when pulled off from filling tube 10 by the volumetric flow rate of the filling material fed into casing material M. Counting wheel 50 is connected to a measuring unit 42. Measuring unit 42 receives signals of sensor 50 and calculates there from the pull-off speed $V_C$ of tubular casing material M when pulled off from filling tube 10. Measuring unit 42 is connected to control unit 40 for controlling clipping machine C.

As it further can be seen from FIG. 1, a second sensor 60 is attached to filling tube 10 in the region of its right end in order to sense the movement of the filling material e.g. the mean flow rate of the filling material when fed through filling tube 10. The term "movement of the filling material" has to be understood as being a characteristic, which is at least proportional to the flow rate of the filling material or the volumetric flow rate of filling material when related to e.g. the diameter of the filling tube. In this configuration, sensor 60 is formed by a flow meter. It has to be understood, that at least a part of sensor 60 is in a sensing contact with the filling material. Second sensor 60 is also coupled to measuring unit 42, which calculates from the detected mean flow or the mean feeding speed, respectively, the volumetric flow rate ($V_F$) of the filling material fed by pump 22 to filling tube 10.

Clipping machine C and filler 20 may be provided as a system for producing said sausage-shaped products. In this system, alternatively to second sensor 60, a second sensor 60a may be connected to pump 22 of filler 20. Second sensor 60a senses the movement of a part of pump 22, e.g. the revolution of its main axis or a blade of pump 22 if it is a type of a fly pump. The movement of the part of pump 22 detected by sensor 60a, corresponds to the movement of the filing material moved by pump 22 towards filling tube 10. Thus, sensor 60a indirectly senses the movement of the filling material.

In the following, a second embodiment of the inventive clipping machine CC is described wherein similar or identical elements have the same reference number like the first embodiment increased by 100 and wherein only the differences to the first embodiment are described.

Figure 2:
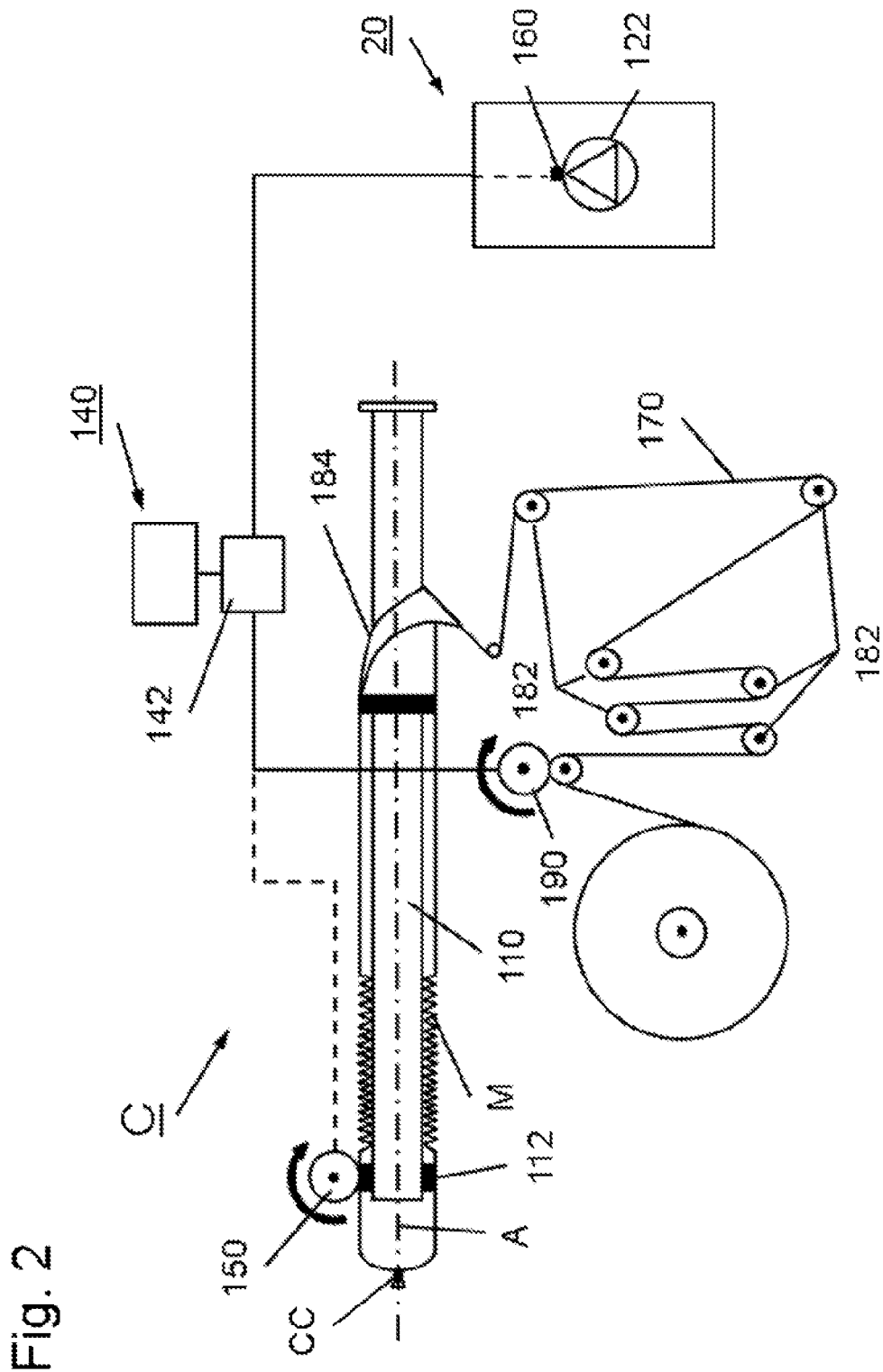
FIG. 2: is a schematically view of a clipping machine for producing sausage-shaped products according to a second embodiment of the present invention.

In contrast to the first embodiment of clipping machine C, in the second embodiment according to FIG. 2, tubular casing material M is produced during the filling process in a known manner, by guiding a thin or flat sheet material 170 stored on a storage reel 180 via several guide rollers 182 to a forming shoulder 184 on filling tube 110 and folding said flat material 170 about filling tube 110. Thereby, a tube is formed from flat material 170 by overlapping it's longitudinally edges. Downstream forming shoulder 184, a not shown sealing device seals the overlapping longitudinally edges of flat material 170, and thereby forms tubular casing material M. Said tubular casing material M is stored on filling tube 110 in a storage region upstream casing break device 112.

Clipping machine C further comprises a first sensor 152, which is positioned at one of guide rollers 182 for measuring the length of flat material 170 pulled off from storage reel 180. Sensor 190 may be a counting wheel, or an optical or electrical sensor for sensing the length of flat material 170 while pulled off from storage reel 180. Moreover, a second sensor 160 similar to sensor 60 of the first embodiment is positioned at pump 122 of filler 120 for sensing a signal corresponding the movement of the filling material, e.g. to the volumetric flow rate of filling material fed by pump 122 to filling tube 120. Alternatively or additionally to first sensor 152, a sensor 150 similar to sensor 50 of the first embodiment may be placed at casing break device 112 and detects the length of tubular casing material M when pulled off from filling tube 110 by the volume flow of the filling material.

In conjunction with FIG. 3, a third embodiment of the inventive clipping machine CC is described in the following, wherein similar or identical elements have the same reference number like the first and second embodiment increased by 100 or 200, respectively and wherein only the differences to the first and second embodiments are described.

In contrast to the embodiments according to FIGS. 1 and 2, filler 220 includes a dosing feeder 222 for feeding predetermined portions of filling material through filling tube 210 in a feeding direction F into a tubular casing material M.

Tubular casing material M is produced during the filling process as described in conjunction with FIG. 2. Alternatively to the storing of tubular casing material M in a storage region on filling tube 210 upstream casing break device 212, said tubular casing material M is produced "inline", or continuously, respectively. That means by feeding filling material into the tubular casing material M, flat material 270 is pulled off from storage feel 280, bent to a tube by forming shoulder 282, sealed by the not shown sealing device and filled with filling material without being stored on filling tube 210.

A first sensor 290, which may be of the same type like sensor 190 as shown in FIG. 2, is positioned at one of guide rollers 282 for measuring the length of flat material 270 pulled off from storage reel 280. An alternative or additional sensor 250 may sense the length of tubular casing material M when pulled off from filling tube 210. In the present embodiment, sensors 290 and 250 should deliver corresponding signals, i.e. they should measure the same length.

Figure 3:
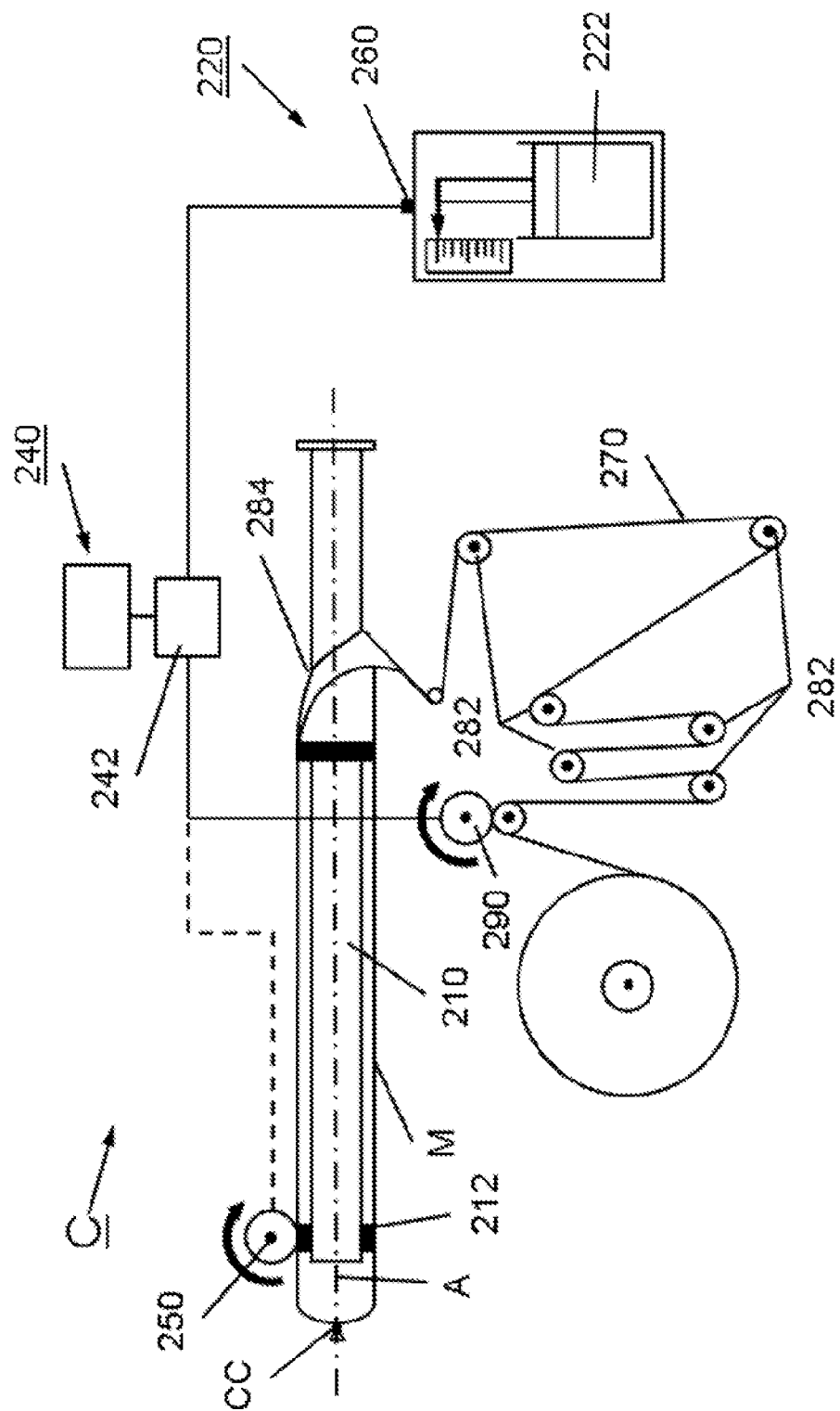
FIG. 3: is a schematically view of a clipping machine for producing sausage-shaped products according to a third embodiment the present invention.

As it further can be seen in FIG. 3, filler 220 of clipping machine C comprises a dosing feeder 222 for feeding predetermined portions of filling material to filling tube 210. A second sensor 260 is coupled to dosing feeder 220 for sensing a signal corresponding to the volume flow rate of filling material fed by dosing feeder 220 to filling tube 220, e.g. the path way of a piston of dosing feeder 220.

Figure 4:
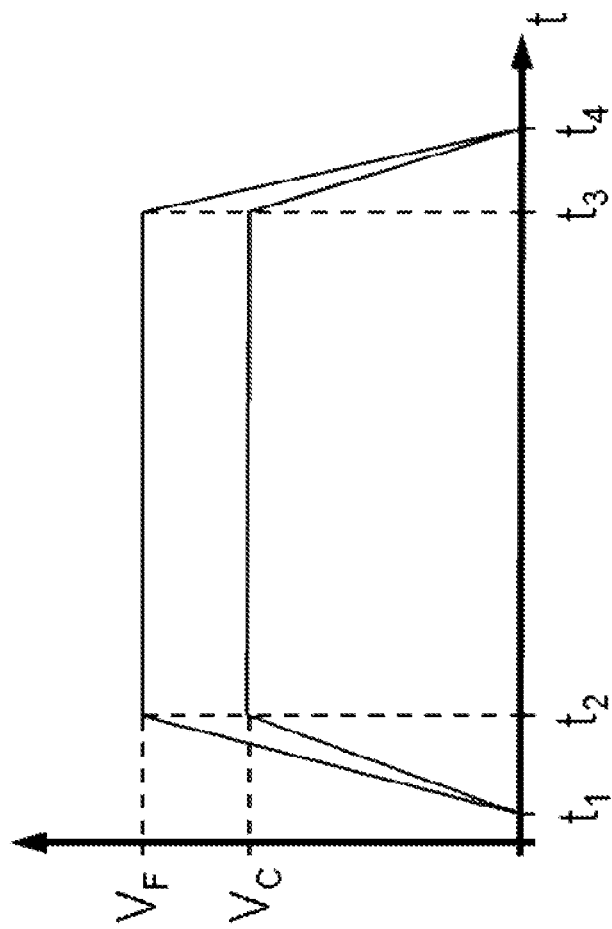
FIG. 4: is a schematically diagram of a clipping cycle according to the inventive method for controlling a clipping machine.

FIG. 4 shows a schematically diagram of a clipping cycle according to the method for controlling clipping machine C. At a time point $t_1$, designating the start point of said clipping cycle, pump 22, 122 or dosing feeder 222 starts feeding filling material into tubular casing material M via filling tube 10, 110, 210. The clipping cycle ends at the time $t_4$, at which a predetermined volume of filling material is fed into tubular casing material M.

As shown in FIG. 4, at the beginning of the clipping cycle in particular from time $t_1$ to time $t_2$, the movement of the filling material represented by the volumetric flow rate $V_F$ increases from a minimum value, which may be the zero value, to a maximum volume. From time $t_2$ to $t_3$, volumetric flow rate $V_F$ is maintained at a constant value. At the end of the clipping cycle, volumetric flow rate $V_F$ degreases to the minimum value at time $t_4$. Due to the fact, that tubular casing material M is pulled off from filling tube 10, 110, 210 by the force of volumetric flow of the filling material, the pull-off length and the speed $V_C$ of casing material M respectively, increases from time $t_1$ to $t_2$ at a rate proportional to the increase rate of volumetric flow rate $V_F$ of the filling material, is maintained constant between times $t_2$ and $t_3$, and decreases accordingly from time $t_3$ to time $t_4$.

Arriving at time $t_4$, the clipping cycle ends by stopping pump 22, 122 or dosing feeder 220, gathering the filled tubular casing material M for forming a plait-like portion, and applying one or two closure clips CC to said plait-like portion, a first in order to close the back end of the tubular casing material M just filled, and a second in order to close the front end of the remaining tubular casing material M stored on filling tube 10, 110, 210 and to be filled subsequently. After the second closure clip CC is applied to the plait-like portion of tubular casing material M, the next clipping cycle starts at time $t_1$. In order to separate the sausage-shaped product just produced, a cutting device cuts off said sausage-shaped product from the remaining tubular casing material M by pushing a knife between said two closure clips CC.

The inventive method for controlling clipping machine C will now be described in conjunction with the clipping machine C according to FIG. 1 and the diagram of a clipping cycle according to FIG. 4.

As previously described, on the basis of the pull-off length, pull-off speed $V_C$ of casing material M may be calculated. Accordingly, from the detected movement of the filling material, the volumetric flow rate $V_F$ of filling material may be derived. In the following, pull-off speed $V_C$ and volumetric flow rate $V_F$ of casing material M are used corresponding to the pull-off length of the casing material M and the movement of the filling material.

For producing sausage-shaped products containing a flowable filling material, like a sealing compound, adhesives, silicones, sausage meat or the like, in a tubular casing material M, tubular casing material M is provided at filling tube 10 of clipping machine C. The front end of tubular casing material M is closed by closure clip CC. Pump 22 starts feeding filling material stored in filler 20, via filling tube 10 into tubular casing material M at time $t_1$. In the start-up phase of pump 22 from time $t_1$ to time $t_2$, volumetric flow rate $V_F$ of filling material increases to a maximum value. Accordingly, at the same time, pulling off casing material M from filling tube 10 caused by volume flow of the filling material starts. During the main filling process between times t2 and t3, volumetric flow rate $V_F$ of filling material and the pull-off speed $V_C$ of casing material M is maintained constant. In the shut-down phase of pump 22 between times $t_3$ and $t_4$, volumetric flow rate $V_F$ of filling material and the pull-off speed $V_C$ of casing material M decreasing accordingly to a minimum value.

As mentioned above, the pull-off speed $V_C$ of casing material M depends on volumetric flow rate $V_F$ of filling material. That means, an increasing, a decreasing or a constant volumetric flow rate $V_F$ of filling material causes an increasing, a decreasing or a constant pull-off speed $V_C$ of tubular casing material M from filling tube 10. Moreover, by given diameters of filling tube 10 and tubular casing material M to be filled, the ratio between the pull-off speed $V_C$ of casing material M and the volumetric flow rate $V_F$ of filling material or the ratio between the pull-off length of tubular casing material M and the flow rate of filling material, respectively, is a constant ratio over the entire filling time or clipping cycle between times $t_1$ and $t_4$.

Tubular casing material M pulled off from filling tube 10, is sensed by first sensor 50 which may be a counting wheel. Second sensor 60 senses the flow rate or the mean flow rate of the filling material through filling tube 10. In this case, second sensor 60 may be a volumetric flow meter. Alternatively, if a system is provided consisting of clipping machine C and filler 20, sensor 60a may sense e.g. the revolution of the main axis of pump 22. First and second sensors 50, 60/60a are coupled to measuring unit 42. Signals of first and second sensors 50, 60/60a are processed in measuring unit 42 and respective values, like pull-off speed $V_C$ and/or pull-off length of casing material M and flow rate and/or volumetric flow rate $V_F$ of the filling material are calculated.

According to the kind of filling material, tubular casing material, casing diameter and the like, there is a specific ratio between the pull-off speed $V_C$ or the pull-off length of tubular casing material M, respectively and volumetric flow rate $V_F$ or the movement the of filling material, generally.

The values of the pull-off speed $V_C$ and/or pull-off length of tubular casing material M and movement and/or volumetric flow rate $V_F$ of the filling material calculated in measuring unit 42 are transmitted to control unit 40, where the ratio between said values is created, checked and compared to one or several predetermined comparison ratios. In case that the calculated ratio between the pull-off speed $V_C$ of tubular casing material M and volumetric flow rate $V_F$ of the filling material matches the predetermined ratio, the filling process is carried on according to the clipping process shown in FIG. 4. If the calculated ratio deviates from the predetermined ratio, control unit 40 will detect said deviation and will cause a respective control action.

Based on the predetermined ratio between the pull-off speed $V_C$ of tubular casing material M and volumetric flow rate $V_F$ of the filling material, in the exemplarily case that flow volume $V_F$ decreases and the pull off speed $V_C$ of tubular casing material M maintains constant, insufficient filling material is fed into tubular casing. Control unit 40 may cause pump 22 to rotate at a higher speed to balance the missing filling material.

On the other hand, if volumetric flow rate $V_F$ of the filling material increases, e.g. exceeds a predetermined value, and the pull-off speed $V_C$ of tubular casing material M maintains at its allowed level, a burst of tubular casing material M may be occurred. In this case, control unit 40 causes pump 22 to stop feeding filling material. Clipping machine C will be stopped and a respective signal may be put out to inform the operator.

In a modified method for controlling clipping machine C, by a given diameter of tubular casing material M, it may be sufficient to compare the captured volumetric flow rate $V_F$ of the filling material just fed to the captured pull-off speed $V_C$ of tubular casing material M, in order to determine, if the volume of filling material fed into the tubular casing material matches the volume of the tubular casing material pulled-off from the filling tube during said feeding. Alternatively to the captured volumetric flow rate $V_F$ of the filling material, by a given diameter of the filling tube, the flow rate of the filling material may be compared to the pull-off speed $V_C$ of tubular casing material M or the pull-off length, respectively.

According to the present method, each deviation from a predetermined ratio between the pull-off speed $V_C$ of tubular casing material M and volumetric flow rate $V_F$ of the filling material causes a respective control signal. In the above mentioned cases, the flow volume $V_F$ may be adapted by manipulating pump 22 or clipping machine C may be completely stopped. Any other control signal may be derived and generated by control unit 40 according to the result of the comparison. The frictional force applied to tubular casing material M by the casing break device 12 may be varied. Moreover, combinations of the described provisions may be activated in order to react on deviations in the ratio between the pull-off speed $V_C$ of tubular casing material M and volumetric flow rate $V_F$ of the filling material.

It has to be understood, that according to specific parameters of the sausage-shaped product to be produced, like the kind of filling material, casing material, or filling level, the ratio between the pull-off speed $V_C$ of tubular casing material M and volumetric flow rate $V_F$ of the filling material varies. Accordingly, several different predetermined comparison ratio values or ratios are stored in a memory inside control unit 40. The operator may than select the ratio to be met with respect to the sausage-shaped product to be produced. Naturally, in case that a specific ratio is not stored in said memory, the operator may manually select a value for said ratio or may adapt an existing value. If a new product having a specific value for the ratio between the pull off-speed $V_C$ of tubular casing material M and volumetric flow rate $V_F$ of the filling material has to be produced, the operator may store said ratio value in the memory of control unit 40.

The first sensor 50 has been described as to be a counting wheel. Naturally, any other sensor may be used to sense a pull-off movement of tubular casing material M, e.g. optical sensors may sense marks at the tubular casing material M or magnetically or electro-magnetically sensors may detect particles incorporated into casing material M.

Second sensor 60/60a may also be of any other suitable type. Additionally, sensor 60 may sense other characteristics than the motion of the main axis of pump 22. In case that the second sensor 60/60a is a volumetric flow sensor, volumetric flow rate $V_F$ may directly be sensed. Moreover, the flow speed of the filling material may be sensed and volumetric flow rate $V_F$ may be calculated on the basis of a respective cross section of e.g. the outlet opening of the pump or the diameter of filling tube 10.

Alternatively to the method described above and using a predetermined value for the ratio between the pull-off speed $V_C$ of tubular casing material M and volumetric flow rate $V_F$ of the filling material, control unit 40 may automatically determine a ratio based on the sensor signals at the beginning of a filling process and may control the production process for the respective product on the basis of said automatically determined ratio.

The ratio between the pull-off speed $V_C$ of tubular casing material M and volumetric flow rate $V_F$ of the filling material as used in the present method may be the quotient of the pull-off speed $V_C$ of tubular casing material M and volumetric flow rate $V_F$ of the filling material. Other ratios may be used, like absolute values e.g. a difference value or the like. It is also possible to determine absolute values for the pull-off speed $V_C$ of casing material M and volumetric flow rate $V_F$ of the filling material and to compare said predetermined absolute values to the respective measured values.

First sensor 50 may not only be used for measuring the pull-off speed $V_C$ or the pull-off length of tubular casing material M for creating the above mentioned ratio, but also for measuring the length of the pulled off tubular casing material M in order to produce sausage-shaped products of equal length.

According to FIG. 1, there is shown one measuring unit 42 connected to first and second sensors 50, 60/60a for calculating the respective value on the basis of the sensor signal. Said calculated values are then transferred to control unit 40. It is also possible to provide a second measuring unit. In this case, each of first and second sensors 50, 60 is coupled to one of the first and second measuring units.

Moreover, measuring unit 42 is described as being a separate unit. It is also possible to integrate measuring unit 42 into control unit 40. In case that a second measuring unit is provided, also the second measuring unit may be incorporated into control unit 40.

Generally, capturing or measuring the pull-off speed $V_C$ of tubular casing material M in conjunction with the present invention means that a value is obtained by the first sensor, representing the pull-off speed $V_C$ of the tubular casing material M, and that a signal is produced and transmitted to control unit 40, representing the pull-off speed $V_C$ of the tubular casing material M. Accordingly, capturing or measuring the volumetric flow rate $V_F$ of the filling material means obtaining a value by the second sensor, representing the volumetric flow rate $V_F$ of the filling material and producing a respective signal which may be transmitted to the control unit 40, in order to calculate the ratio between the pull-off speed $V_C$ of the tubular casing material M and the volumetric flow rate $V_F$ of the filling material.

Regarding FIG. 4, there is shown a linear relation between of the pull-off speed $V_C$ of tubular casing material M and volumetric flow rate $V_F$ of the filling material. Other non-linear relationships are possible. Said non-linear relationships may also be stored in the memory of control unit 40 and may be selected by the operator for the respective production process.

Previously, in conjunction with FIGS. 1 to 4, capturing the pull-off speed $V_C$ of tubular casing material M and volumetric flow rate $V_F$ of the filling material, and controlling clipping machine C on the basis of the ratio between the pull-off speed $V_C$ of tubular casing material M and volumetric flow rate $V_F$ of the filling material has been described.

Again, it is the general idea of the present invention to capture the pull-off length of the casing material M when pulled off from filling tube 10 and to capture the movement of the filling material while being fed into casing material M, to create a ratio between said captured values and to control the clipping machine C on the basis of said ratio.

The method for controlling clipping machine C, described in conjunction with the first embodiment of clipping machine C according to FIG. 1, may accordingly be adopted to clipping machine C of the second and third embodiment as shown and described in conjunction with FIGS. 2 and 3. That means, sensor signals of second sensors 160, 260 are compared to signals of first sensors 190, 290 or, alternatively, to signals from sensors 150, 250, for calculating a respective ratio and deriving control signals therefrom in order to control clipping machine C in the above described manner.

The invention claimed is:

1. A method for controlling a clipping machine for producing sausage-shaped products, containing a flowable filling material in a tubular casing material comprising the steps of:
    feeding the filling material into the tubular casing material stored on a filling tube and being closed at a front end of the tubular casing material by a closing clip;
    placing and closing at least one closing clip on a back end of the tubular casing material filled by a clipping device;
    capturing a pull-off length of the tubular casing material when removed from the filling tube by a first sensor;
    capturing the movement of the filling material while being fed to the tubular casing material by a second sensor;
    creating a ratio between the length of the tubular casing material and the movement of the filling material; and
    generating a control signal by a control unit for acting on the clipping machine based on the ratio between the pull-off length of the tubular casing material and the movement of the filling material.

2. The method according to claim 1, wherein the control unit compares the ratio of the captured pull-off length of the tubular casing material and the movement of the filling material to a predetermined comparison ratio, in accordance with one or more specific product features stored in the control unit.

3. The method according to claim 2, wherein the control unit detects a change of the ratio created from the captured pull-off length of the tubular casing material and the movement of the filling material.

4. The method according to claim 3, wherein the control unit compares the predetermined comparison ratio and the ratio created from the captured pull-off length of the tubular casing material and the movement of the filling material to detect casing material bursts.

5. The method according claim 2, wherein the control unit shuts down the clipping machine in case of an impermissible deviation between the predetermined comparison ratio and the ratio created from the captured pull-off length of the tubular casing material and the movement of the filling material.

6. The method according to claim 2, wherein the product features are selected from the group consisting of product types, filling materials, and tubular casing materials.

7. The method according to claim 1, wherein the movement of the filling material is captured based on a signal derived from the material flow through the filling tube.

8. The method according to claim 1, wherein the movement of the filling material is captured on the basis of a signal derived from a feeding device for the filling material.

9. The method according to claim 1, wherein the flowable filling material is a sealing compound.

10. The method according to claim 1, wherein the step of placing and closing at least one closing clip on a back end of the tubular casing material occurs after the tubular casing material was just filled by a clipping device.

11. A clipping machine for producing sausage-shaped products containing a flowable filling material in a tubular casing material, said clipping machine comprising:
    a filling tube for feeding filling material into the tubular casing material stored on the filling tube and being closed at a front end of the tubular casing material by a closing clip;
    a clipping device for placing and closing at least one closing clip on a back end of tubular casing material filled;
    a control unit for controlling the clipping machine;
    wherein a first sensor for measuring a pull-off length of the tubular casing material pulled off from the filling tube and a second sensor for measuring a movement of the filling material while being fed to the tubular casing material are provided, wherein the first and second sensor intercommunicate with the control unit;
    wherein the control unit creates a ratio between the pull-off length of the tubular casing material when pulled off the filling tube and the movement of the filling material while being feed to the tubular casing material, measured by the first and second sensor, and
    wherein the control unit also generates a control signal to act on the clipping machine based on the ratio between the pull-off length of the tubular casing material and the movement of the filling material.

12. The clipping machine according to claim 11, wherein the first and second sensor are connected to a first measuring unit.

13. The clipping machine according to claim 12, wherein the first measuring unit is incorporated into the control unit.

14. The clipping machine according to claim 12, wherein the first measuring unit is separated from the control unit.

15. The clipping machine according to claim 12, wherein a second measuring unit is provided, and wherein the first measuring unit comprises the first sensor and the second measuring unit comprises the second sensor.

16. The clipping machine according to claim 11, wherein the flowable filling material is a sealing compound.

17. The clipping machine according to claim 11, wherein the step of placing and closing at least one closing clip on a back end of the tubular casing material occurs after the tubular casing material was just filled by a clipping device.

* * * * *